(12) United States Patent
Kato

(10) Patent No.: US 9,657,806 B2
(45) Date of Patent: May 23, 2017

(54) ELECTROMAGNETIC DAMPER

(71) Applicant: HONDA MOTOR CO., LTD., Tokyo (JP)

(72) Inventor: Takafumi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/962,515

(22) Filed: Dec. 8, 2015

(65) Prior Publication Data

US 2016/0159185 A1     Jun. 9, 2016

(30) Foreign Application Priority Data

Dec. 9, 2014   (JP) ................................ 2014-249007
Feb. 9, 2015   (JP) ................................ 2015-022791

(51) Int. Cl.

| F16F 15/00 | (2006.01) |
|---|---|
| B60G 13/16 | (2006.01) |
| B60G 13/00 | (2006.01) |
| B60G 17/06 | (2006.01) |

(52) U.S. Cl.
CPC ............ *F16F 15/005* (2013.01); *B60G 13/00* (2013.01); *B60G 17/06* (2013.01); *B60G 2202/25* (2013.01); *B60G 2400/204* (2013.01); *B60G 2400/41* (2013.01); *B60G 2400/44* (2013.01); *F16F 2222/06* (2013.01)

(58) Field of Classification Search
CPC ............... B60G 13/16; B60G 2202/25; B60G 2400/204; B60G 2400/41; B60G 2400/44; F16F 15/005; F16F 2222/06

USPC ....................................................... 701/37–40
See application file for complete search history.

(56) References Cited

U.S. PATENT DOCUMENTS

| 4,756,393 A * | 7/1988 | Collee ..................... F16F 9/462 188/266.2 |
|---|---|---|
| 4,770,438 A * | 9/1988 | Sugasawa .......... B60G 17/0165 180/169 |
| 5,678,847 A * | 10/1997 | Izawa .................. B60G 15/063 280/5.515 |
| 7,005,816 B2 * | 2/2006 | Hio ..................... B60G 17/0165 188/266 |
| 7,357,229 B2 * | 4/2008 | Kondo .................... F16F 15/03 188/267 |

(Continued)

FOREIGN PATENT DOCUMENTS

| EP | 1582383 A1 | 10/2005 |
|---|---|---|
| JP | 2003-343647 A | 12/2003 |

(Continued)

OTHER PUBLICATIONS

Office Action dated Dec. 6, 2016; issued in counterpart Japanese Application No. 2015-022791 with English Translation (8 pages).

*Primary Examiner* — Thomas Tarcza
*Assistant Examiner* — Tyler J Lee
(74) *Attorney, Agent, or Firm* — Westerman, Hattori, Daniels & Adrian, LLP

(57) ABSTRACT

An electromagnetic damper includes a torque detection unit that detects a torsional torque of an output shaft of an electric motor or a torsional torque of a transmission shaft, which transmits an external vibration to the electric motor, and a control device that controls the electric motor. The control device controls the electric motor so as to cancel the torsional torque detected by the torque detection unit.

9 Claims, 8 Drawing Sheets

(56) References Cited

U.S. PATENT DOCUMENTS

| | | | | |
|---|---|---|---|---|
| 7,533,890 B2* | 5/2009 | Chiao | ................ | B60G 17/0152 |
| | | | | 280/5.504 |
| 8,070,169 B2* | 12/2011 | Kim | .................. | B60G 21/0555 |
| | | | | 280/5.506 |
| 9,035,477 B2* | 5/2015 | Tucker | .................... | F01C 1/103 |
| | | | | 290/1 R |
| 2005/0211516 A1* | 9/2005 | Kondo | .................. | F16F 15/035 |
| | | | | 188/267 |
| 2005/0230201 A1* | 10/2005 | Kondou | ................. | B60G 13/00 |
| | | | | 188/267 |
| 2006/0043804 A1* | 3/2006 | Kondou | ............. | B60G 17/0157 |
| | | | | 310/68 B |
| 2007/0255466 A1* | 11/2007 | Chiao | ................ | B60G 17/0152 |
| | | | | 701/37 |

FOREIGN PATENT DOCUMENTS

| | | |
|---|---|---|
| JP | 2005-256927 A | 9/2005 |
| JP | 2006-57668 A | 3/2006 |
| JP | 2009-150465 A | 7/2009 |
| JP | 2009-208589 A | 9/2009 |
| JP | 2012-517563 A | 8/2012 |

* cited by examiner

ELECTROMAGNETIC DAMPER

CROSS REFERENCES TO RELATED APPLICATIONS

The present application claims priority under 35 U.S.C. §119 to Japanese Patent Application No. 2015-022791, filed Feb. 9, 2015, entitled "Electromagnetic Damper." The contents of this application are incorporated herein by reference in their entirety.

BACKGROUND

1. Field

The present disclosure relates to an electromagnetic damper that inputs an external vibration to an output shaft of an electric motor and generates a damping force with respect to the external vibration by using the electric motor.

2. Description of the Related Art

In Japanese Unexamined Patent Application Publication No. 2006-057668, the purpose thereof is to improve ride comfort of a vehicle, even with a shock absorber that generates a damping force by utilizing an electromagnetic force of a motor (paragraph [0007], abstract). A shock absorber D of Japanese Unexamined Patent Application Publication No. 2006-057668 is provided with a motion conversion mechanism T for converting linear relative motion between a vehicle body B and an axle into rotary motion and a motor M to which rotary motion converted by the motion conversion mechanism T is transmitted. In the shock absorber D, the motor M is fixed to a vehicle body B side, the motion conversion mechanism T is interposed between the vehicle body B and the axle, a sprung side connection mass is reduced, and a force for transmitting input of a vibration from an axle side to the vehicle body B side is reduced. In doing so, ride comfort of the vehicle is improved (Abstract).

The motor M is connected to a control device (not shown) and an external power source (not shown) in such a manner that the motor M is capable of controlling rotary torque of a rotor 1, and the motor M is adjusted so as to obtain a desired damping force. Furthermore, by actively driving the motor M, the shock absorber D is made to function not only as a shock absorber but also as an actuator (paragraph [0016]).

In the shock absorber D (electromagnetic damper) of Japanese Unexamined Patent Application Publication No. 2006-057668, an inertia force (or an inertia moment) is generated when the motion conversion mechanism T converts linear relative motion between the vehicle body B and the axle into rotary motion and when the rotor 1 of the motor M generates rotary torque. With such a configuration in which the inertia force is relatively large, if acceleration of input (for example, input from a road surface) to the shock absorber D is large, the inertia force suppresses changes in stroke of the shock absorber D. Consequently, the vibration damping function of the shock absorber D may not be fully exhibited (for example, in a case where the shock absorber D is used in a suspension device of a vehicle, ride comfort of the vehicle may be reduced).

SUMMARY

The present application describes an electromagnetic damper capable of improving a vibration damping characteristic.

An electromagnetic damper according to an aspect of an embodiment inputs an external vibration to an output shaft of an electric motor, generates, in the electric motor, a damping force with respect to the external vibration, and includes: a torque detection unit that detects a torsional torque of the output shaft of the electric motor or a torsional torque of a transmission member such as a transmission shaft that transmits the external vibration to the electric motor; and a control device that controls the electric motor so as to cancel the torsional torque detected by the torque detection unit.

According to the aspect of the embodiment, the electric motor is controlled so as to cancel a torsional torque of the output shaft of the electric motor or a torsional torque of the transmission member that transmits an external vibration to the electric motor. The torsional torque contains a disturbance factor such as an inertia force. Therefore, the influence of the disturbance factor is reduced by transmitting the power of the electric motor to the output shaft or the transmission member while suppressing the torsional torque, and thereby a target value of the power of the electric motor can be realized with greater certainty. As a result, a vibration damping characteristic of the electromagnetic damper (for example, in a case where the electromagnetic damper is installed on a suspension device of a vehicle, ride comfort of the vehicle) can be improved.

Furthermore, with a configuration in which the torque detection unit detects a torsional torque of the output shaft of the electric motor, if the ratio of the inertia of the electric motor (rotor, etc.) to the inertia of the entire electromagnetic damper is high, it is possible to easily cancel the inertia of the electric motor.

The electromagnetic damper may include a threaded shaft as the transmission member and a nut screwed onto the threaded shaft, and may convert linear motion of the nut with respect to the threaded shaft into rotary motion of the threaded shaft and transmit the rotary motion of the threaded shaft to the output shaft of the electric motor.

The electromagnetic damper may include a rack gear formed on the side of the transmission member and a pinion gear formed on the side of the output shaft of the electric motor, and may convert linear motion of the transmission member into rotary motion by using the rack gear and the pinion gear and transmit rotary motion of the pinion gear to the output shaft of the electric motor.

The electromagnetic damper may include a rotary arm that rotates around the output shaft of the electric motor, and the torque detection unit may detect a torsional torque of the output shaft of the electric motor or a torsional torque of the rotary arm.

The electromagnetic damper may be installed in a suspension device of a vehicle. In this case, the control device may reduce a degree of canceling the torsional torque as a steering angle or a steering angle speed of a steering increases. Consequently, if the vehicle travels on a curved road, for example, the damping force of the electromagnetic damper can be reduced while the influence of the inertia force is being relatively maintained. Therefore, the steering responsiveness or the stability of the operation can be improved, and in addition, ride comfort is improved.

The control device may reduce a degree of canceling the torsional torque as a vehicle speed of the vehicle increases. Consequently, a degree of canceling the torsional torque is reduced as the vehicle speed increases, and therefore, the stability of the vehicle in a high vehicle speed region can be ensured.

The control device may include a reference control amount calculation section (a reference control amount calculator) that calculates a reference control amount of the electric motor, a correction control amount calculation section (a correction control amount calculator) that calculates a correction control amount by correcting the reference control amount, and an electric motor control section (an electric motor controller) that controls the electric motor on the basis of the correction control amount. The correction control amount calculation section may calculate the correction control amount by reflecting a difference between the torsional torque and a torque corresponding to the reference control amount in the reference control amount. Consequently, a disturbance factor included in the torsional torque can be accurately excluded.

The torque detection unit may be a magnetostrictive torque sensor, for example. Consequently, a torsional torque of the output shaft of the electric motor or a torsional torque of the transmission member can be accurately detected.

According to the present application, a vibration damping characteristic of the electromagnetic damper can be improved.

DESCRIPTION OF THE PREFERRED EMBODIMENTS

A. One Embodiment

A1. Configuration of Vehicle 10

A1-1. Overall Structure of Vehicle 10

Figure 1:
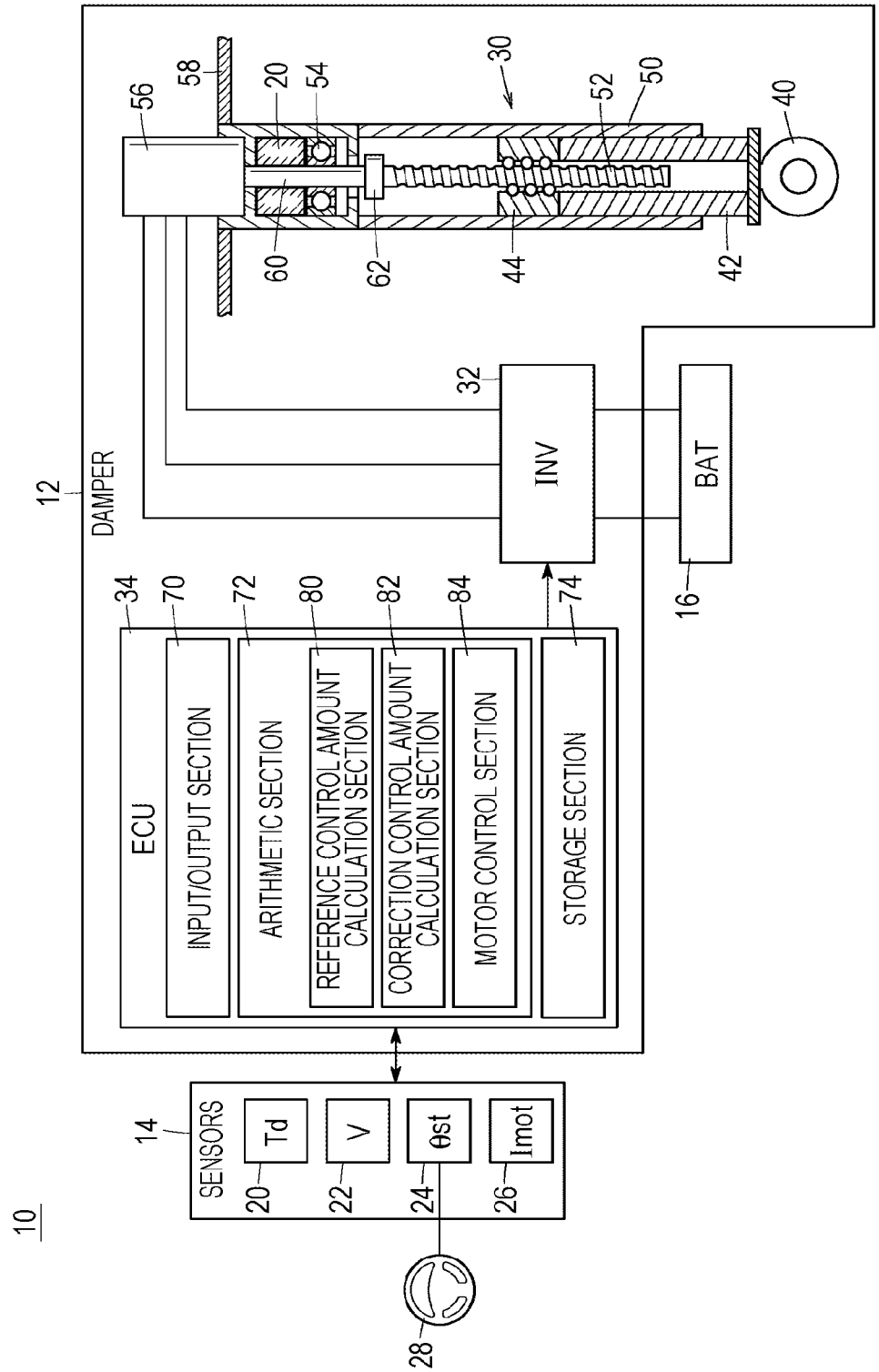
FIG. 1 is a simplified diagram illustrating a part of a vehicle in which an electromagnetic damper according to an embodiment is mounted.

FIG. 1 is a simplified diagram illustrating a part of a vehicle 10 in which an electromagnetic damper 12 (hereinafter also referred to as "damper 12") according to one embodiment is mounted. The damper 12 of the embodiment constitutes a part of a suspension device of the vehicle 10. The suspension device includes a spring (for example, a coil spring) in addition to the damper 12. Furthermore, the vehicle 10 is provided with sensors 14 and a battery 16. Note that the dampers 12 are installed on the front wheels (left front wheel and right front wheel) and the rear wheels (left rear wheel and right rear wheel). Alternatively, the damper 12 may be installed on the front wheels only or the rear wheels only.

The sensors 14 include a torque sensor 20, a vehicle speed sensor 22, a steering angle sensor 24, and a current sensor 26. The torque sensor 20 detects a torsional torque Td (hereinafter also referred to as "torque Td" or "detected torque Td") applied to a part (an output shaft 60 of a motor 56 to be described later) of the damper 12.

As the torque sensor 20 of the embodiment, a magnetostrictive torque sensor, for example, may be used. Note that although two torque sensors 20 are shown in FIG. 1, those torque sensors are identical and are illustrated in order to indicate that the torque sensor 20 is included in the sensors 14 and in order to indicate the position of the torque sensor 20 in the damper 12 (especially the damper body 30).

The vehicle speed sensor 22 detects vehicle speed V[km/h] of the vehicle 10. The steering angle sensor 24 detects steering angle $\theta$st[°] of a steering 28. The current sensor 26 detects input/output current [A](hereinafter referred to as "motor current Imot") of the motor 56 of the damper 12. Note that the motor 56 of the embodiment is a three-phase alternating current (AC) motor and therefore, the current sensor 26 detects currents of multiple phases (U-phase, V-phase, and W-phase) and calculates motor current Imot as a d-axis current (a torque component) obtained by dq-converting these currents.

The battery 16 is a lead battery, for example, but may be another type of battery or power storage device (for example, a lithium ion battery, a generator, a fuel cell, or a capacitor).

A1-2. Damper 12

A1-2-1. Overview of Damper 12

As illustrated in FIG. 1, the damper 12 has a damper body 30, an inverter 32, and an electronic control unit 34 (hereinafter referred to as "ECU 34").

A1-2-2. Damper Body 30

A1-2-2-1. Overview of Damper Body 30

As illustrated in FIG. 1, the damper body 30 is provided with a connection section 40, an inner tube 42, and a nut 44 as members on the side of a wheel (not shown). Furthermore, the damper body 30 is provided with an outer tube 50, a threaded shaft 52, a bearing 54, and a motor 56 as members on the side of a vehicle body 58.

The connection section 40 is fixed to a knuckle (not shown) of a suspension device, thereby being connected to a wheel. When an external vibration is input to the connection section 40 from a wheel side and the connection section 40 is applied with, for example, an upward thrust (a so-called damping direction) in FIG. 1, the inner tube 42 and the nut 44 move upward relative to the outer tube 50, thereby rotating the threaded shaft 52. In doing so, vibration of the spring of the suspension device can be damped by generating a reaction force from the motor 56 with respect to the threaded shaft 52.

As a basic configuration of the damper body 30, an existing feature (see, for example, Japanese Unexamined Patent Application Publication No. 2006-057668, the entire contents of which are incorporated herein by reference) may be used.

A1-2-2. Motor 56

The motor 56 of the embodiment is of a three-phase AC brushless type, but is not limited thereto. The output shaft 60 of the motor 56 is connected to or fixed to the threaded shaft 52 via a coupling 62. The motor 56 generates power (reaction force) in the threaded shaft 52 on the basis of the electric power supplied from the battery 16 in response to an instruction from the ECU 34. In addition, the motor 56 may output a generated electric power to the battery 16 by performing electric power generation (regeneration) on the basis of power input to the threaded shaft 52 from the wheel side.

A1-2-3. Inverter 32

The inverter 32 has a three-phase full-bridge configuration, performs DC-AC conversion to convert direct current (DC) into three-phase alternating current, and supplies the three-phase alternating current to the motor 56. The inverter 32 may supply to the battery 16 direct current obtained by AC-DC conversion associated with regeneration operation.

A1-2-4. ECU 34

As illustrated in FIG. 1, the ECU 34 has an input/output section 70, an arithmetic section 72, and a storage section 74. The input/output section 70 inputs/outputs signals to/from the sensors 14, the inverter 32, etc.

The arithmetic section 72 controls each section of the damper 12 and is provided with a reference control amount calculation section 80, a correction control amount calculation section 82, and a motor control section 84. In the embodiment, the reference control amount calculation section 80, the correction control amount calculation section 82, and the motor control section 84 are realized by executing control programs stored in the storage section 74.

The reference control amount calculation section 80 calculates a reference control amount Uref of the motor 56. The reference control amount Uref is a reference value (a value before correction) of a variable amount for controlling the motor 56 and is a target reference force Fref_tar[N] in the embodiment. The target reference force Fref_tar is a reference value of a force generated in the motor 56.

The correction control amount calculation section 82 calculates a correction control amount Ucor by correcting the reference control amount Uref. The correction control amount Ucor is obtained by correcting the reference control amount Uref to cancel a disturbance factor such as inertia, and is a target motor current Imot_tar in the embodiment. The motor control section 84 controls the motor 56 via the inverter 32 on the basis of the correction control amount Ucor.

The storage section 74 stores data and various programs such as a control program used in the arithmetic section 72.

A2. Control in the Embodiment

A2-1. Overall Flow

Figure 2:
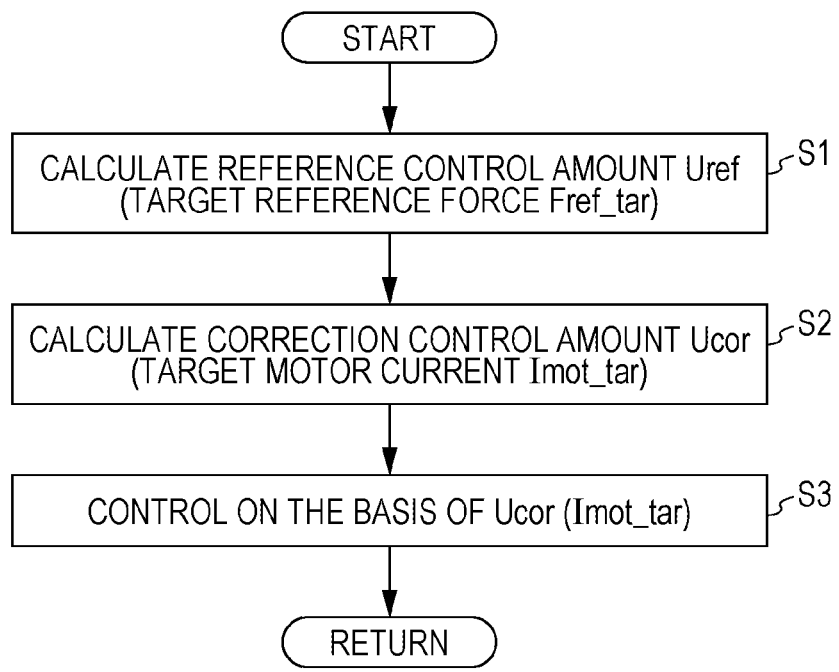
FIG. 2 is a flowchart illustrating overall flow of control of an electronic control device of the embodiment.

FIG. 2 is a flowchart illustrating overall flow of control of the ECU 34 of the embodiment. In step S1, the reference control amount calculation section 80 of the ECU 34 calculates a reference control amount Uref. In step S2, the correction control amount calculation section 82 of the ECU 34 calculates a correction control amount Ucor. In step S3, the motor control section 84 of the ECU 34 operates the inverter 32 on the basis of the correction control amount Ucor to control the motor 56.

A2-2. Calculation of Reference Control Amount Uref

As described above, the reference control amount Uref is a reference value of a variable amount for controlling the motor 56 and is a target reference force Fref_tar[N] in the embodiment. The ECU 34 calculates a reference control amount Uref by using, for example, the same method as in Japanese Unexamined Patent Application Publication No. 2004-237824 or Japanese Unexamined Patent Application Publication No. 2009-078761, the entire contents of which are incorporated herein by reference.

A2-3. Calculation of Correction Control Amount Ucor

A2-3-1. Basic Concept

The correction control amount Ucor of the embodiment is used to cancel a disturbance factor such as inertia of the damper body 30. In the embodiment, the inertia of a rotor (hereinafter also referred to as "motor rotor") (not shown) of the motor 56 is relatively large in the damper body 30. Consequently, by canceling the inertia of the motor rotor, it is possible to easily bring the output of the motor 56 close to the reference control amount Uref (target reference force Fref_tar).

A2-3-2. Specific Processing

A2-3-2-1. Overview

Figure 3:
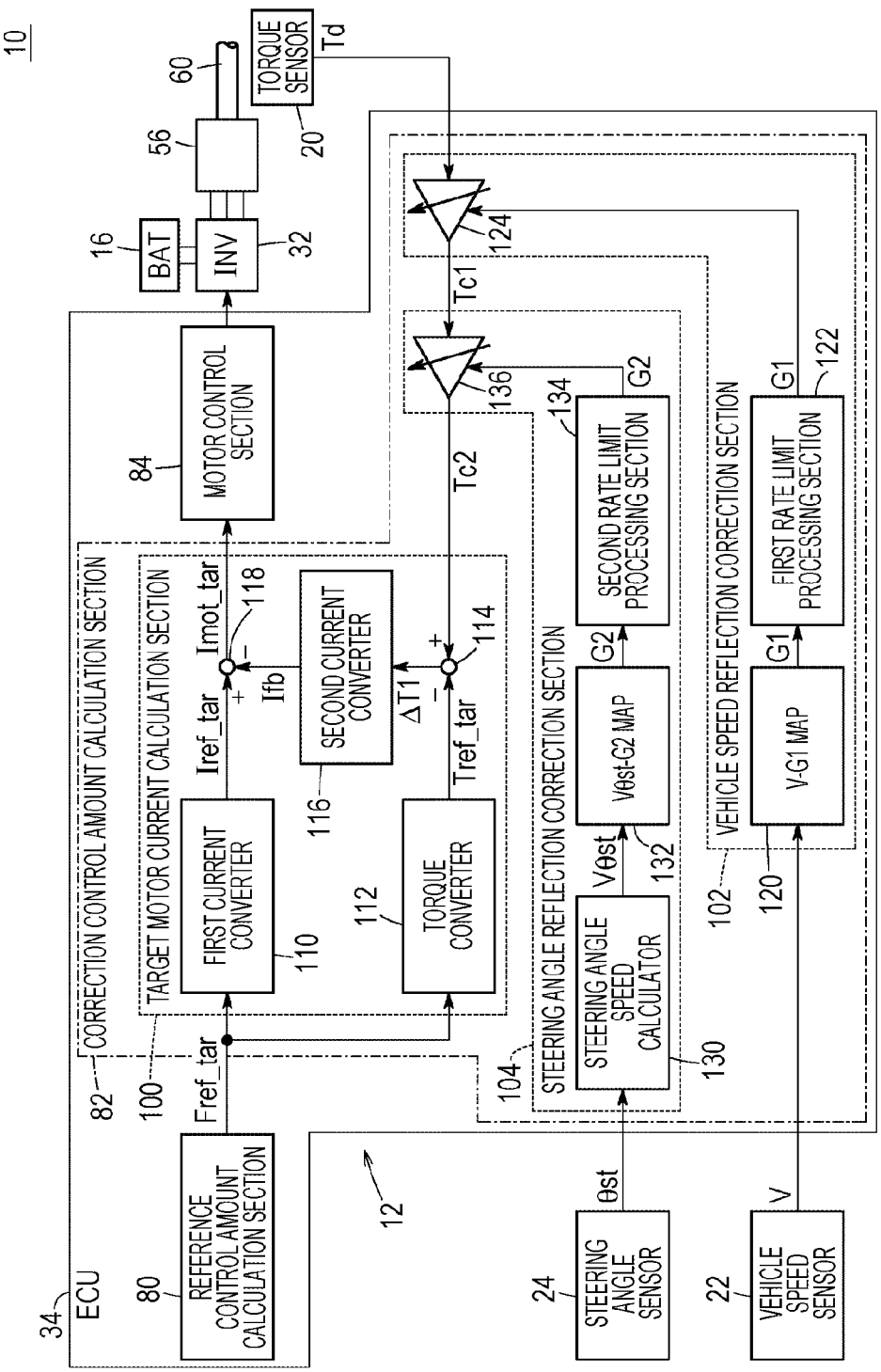
FIG. 3 is a block diagram illustrating a configuration for controlling a motor of the embodiment, focusing on the calculation of a correction control amount.

FIG. 3 is a block diagram illustrating a configuration for controlling the motor 56 of the embodiment, focusing on the calculation of a correction control amount Ucor. As illustrated in FIG. 3, the correction control amount calculation section 82 of the ECU 34 has a target motor current calculation section 100, a vehicle speed reflection correction section 102, and a steering angle reflection correction section 104.

A2-3-2-2. Target Motor Current Calculation Section 100

The target motor current calculation section 100 (hereinafter also referred to as "calculation section 100") calculates a target motor current Imot_tar as a correction control amount Ucor. As illustrated in FIG. 3, the calculation section 100 has a first current converter 110, a torque converter 112, a first subtracter 114, a second current converter 116, and a second subtracter 118.

The first current converter 110 converts a target reference force Fref_tar[N] as a reference control amount Uref into a current value (target reference current Iref_tar)[A]. The torque converter 112 converts the target reference force Fref_tar into a torque value (target reference torque Tref_tar) [Nm].

The first subtracter 114 calculates a difference ΔT1 between a second correction torque Tc2 output from the steering angle reflection correction section 104 and a target reference torque Tref_tar output from the torque converter 112. The second current converter 116 converts the difference ΔT1 [Nm] calculated in the first subtracter 114 into a current value (F/B current Ifb)[A]. The second subtracter 118 calculates a difference, as a target motor current Imot_tar, between the target reference current Iref_tar output from the first current converter 110 and the F/B current Ifb output from the second current converter 116 and outputs the target motor current Imot_tar to the motor control section 84.

A2-3-2-3. Vehicle Speed Reflection Correction Section 102

The vehicle speed reflection correction section 102 (hereinafter also referred to as "correction section 102") reflects a vehicle speed V in the detected torque Td detected by the torque sensor 20. As illustrated in FIG. 3, the correction section 102 has a vehicle speed-first gain map 120 (hereinafter also referred to as "map 120"), a first rate limit processing section 122, and a vehicle speed reflection amplifier 124 (hereinafter also referred to as "first amplifier 124").

Figure 4:
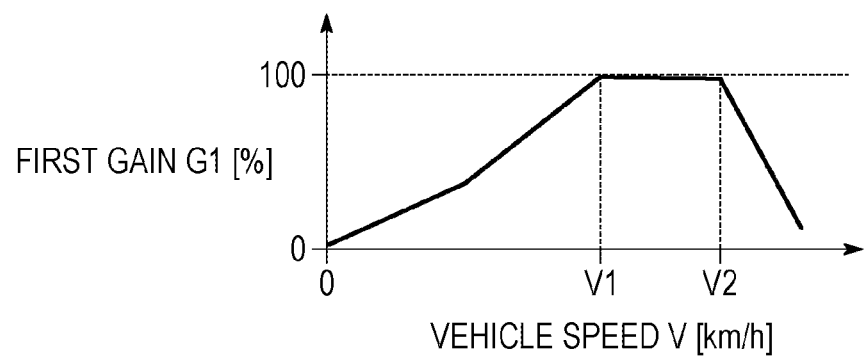
FIG. 4 shows one example of the contents of a vehicle speed-first gain map according to the embodiment.

FIG. 4 shows one example of the contents of the vehicle speed-first gain map 120 according to the embodiment. The map 120 stores a relationship between vehicle speed V and first gain G1 and outputs a first gain G1 in accordance with a vehicle speed V output from the vehicle speed sensor 22.

The first gain G1 is a gain for weighting a disturbance factor (especially inertia force) on the basis of the vehicle speed V. As illustrated in FIG. 4, when the vehicle speed V is between zero and V1, the first gain G1 increases as the vehicle speed V increases. When the vehicle speed V is between V1 and V2, the first gain G1 is constant. When the vehicle speed V exceeds V2, the first gain G1 decreases as the vehicle speed V increases. Note that the vehicle speed V1 may be any value between 50 and 120 km/h, for example. Furthermore, the vehicle speed V2 may be any value between 80 and 180 km/h, for example.

The first gain G1 is used as a gain for the detected torque Td in the first amplifier 124. Therefore, when the first gain G1 increases, the detected torque Td is output to the first subtracter 114 while the detected torque Td is being kept close to the original value.

As the detected torque Td (to be precise, the second correction torque Tc2) output to the first subtracter 114 approaches the original value, the absolute value of the F/B current Ifb to be subtracted in the second subtracter 118 increases, and thereby the target motor current Imot_tar decreases. Meanwhile, as the detected torque Td (to be precise, the second correction torque Tc2) output to the first subtracter 114 becomes smaller than the original value, the absolute value of the F/B current Ifb to be subtracted in the second subtracter 118 decreases, and thereby the target motor current Imot_tar increases. Therefore, by using the first gain G1, a degree of feedback of the detected torque Td can be weakened as the vehicle speed V increases.

The first rate limit processing section 122 limits the absolute value of a difference between the previous value and the current value of the first gain G1 output from the map 120 so as not to exceed a predetermined threshold and outputs the first gain G1 to the vehicle speed reflection amplifier 124.

The first amplifier 124 multiplies the detected torque Td output from the torque sensor 20 by the first gain G1 output from the first rate limit processing section 122 to calculate a first correction torque Tc1 and outputs the first correction torque Tc1 to the steering angle reflection correction section 104.

A2-3-2-4. Steering Angle Reflection Correction Section 104

The steering angle reflection correction section 104 (hereinafter also referred to as "correction section 104") reflects steering angle speed Vθst in the first correction torque Tc1 output from the vehicle speed reflection correction section 102. The positions of the vehicle speed reflection correction section 102 and the steering angle reflection correction section 104 may be exchanged. As illustrated in FIG. 3, the correction section 104 has a steering angle speed calculator 130, a steering angle speed-second gain map 132 (hereinafter also referred to as "map 132"), a second rate limit processing section 134, and a steering angle speed reflection amplifier 136.

The steering angle speed calculator 130 (hereinafter also referred to as "calculator 130") calculates a steering angle speed Vθst[°/sec] as a time differential value of steering angle θst[° ].

Figure 5:
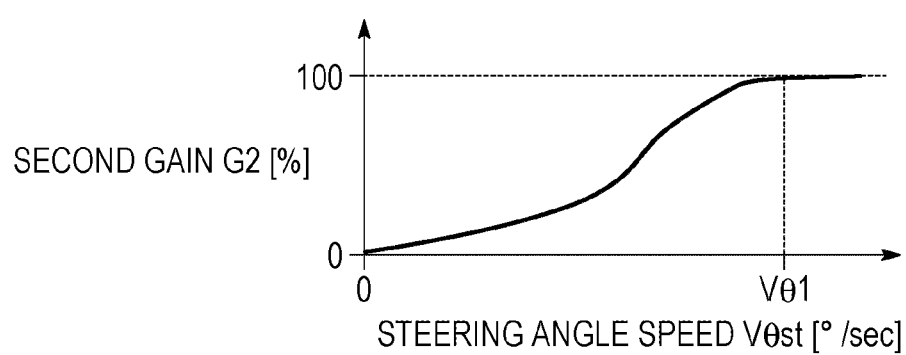
FIG. 5 shows one example of the contents of a steering angle speed-second gain map according to the embodiment.

FIG. 5 shows one example of the contents of the steering angle speed-second gain map 132 according to the embodiment. The map 132 stores a relationship between steering angle speed Vθst and second gain G2 and outputs a second gain G2 in accordance with a steering angle speed Vθst output from the calculator 130.

The second gain G2 is a gain for weighting a disturbance factor (especially inertia force) on the basis of the steering angle θst or the steering angle speed Vθst. As illustrated in FIG. 5, when the steering angle speed Vθst is between zero and Vθ1, the second gain G2 increases as the steering angle speed Vθst increases. When the steering angle speed Vθst exceeds Vθ1, the second gain G2 is constant. The action of the second gain G2 is the same as the action of the first gain G1. That is, by using the second gain G2, a degree of feedback of the detected torque Td can be weakened as the steering angle speed Vθst increases.

The second rate limit processing section 134 limits the absolute value of a difference between the previous value and the current value of the second gain G2 output from the map 132 so as not to exceed a predetermined threshold and outputs the second gain G2 to the steering angle speed reflection amplifier 136. The steering angle speed reflection amplifier 136 multiplies the first correction torque Tc1 output from the vehicle speed reflection correction section 102 by the second gain G2 output from the second rate limit processing section 134 to calculate a second correction torque Tc2 and outputs the second correction torque Tc2 to the first subtracter 114 of the target motor current calculation section 100.

A2-4. Control of Motor Control Section 84

The motor control section 84 (hereinafter also referred to as "control section 84") controls the motor 56 via the inverter 32 on the basis of the correction control amount Ucor (target motor current Imot_tar) output from the correction control amount calculation section 82. More specifically, the control section 84 controls the duty ratio of a switching element (not shown) of the inverter 32 so as to realize the target motor current Imot_tar. In doing so, the control section 84 uses the motor current Imot detected by the current sensor 26.

A3. Effects of the Embodiment

According to the embodiment, the motor 56 (electric motor) is controlled so as to cancel the torsional torque Td of the output shaft 60 of the motor 56 (FIGS. 2 and 3). The torsional torque Td contains a disturbance factor such as an inertia force. Therefore, the influence of the disturbance factor is reduced by transmitting the power of the motor 56 to the output shaft 60 or the threaded shaft 52 (transmission shaft) while suppressing the torsional torque Td, and thereby the target value (target reference force Fref_tar) of the power of the motor 56 can be realized with greater certainty. As a result, a vibration damping characteristic of the electromagnetic damper 12 (for example, ride comfort of the vehicle 10) can be improved.

Furthermore, with a configuration in which the torque sensor 20 (torque detection unit) detects a torsional torque Td of the output shaft 60 of the motor 56, if the ratio of the inertia of the motor 56 (motor rotor, etc.) to the inertia of the entire electromagnetic damper 12 is high, it is possible to easily cancel the inertia of the motor 56.

In the embodiment, the ECU 34 weakens a degree of feedback of the detected torque Td as the steering angle speed Vθst increases (FIGS. 3 and 5). In other words, the ECU 34 reduces a degree of canceling the torsional torque Td as the steering angle speed Vθst increases. Consequently, if the vehicle 10 travels on a curved road, for example, the damping force of the electromagnetic damper 12 can be reduced while the influence of the inertia force is being relatively maintained. Therefore, the steering responsiveness or the stability of the operation can be improved, and in addition, ride comfort is improved.

That is, the inertia force associated with the operation of the damper 12 is proportional to the sprung acceleration or the unsprung acceleration of the damper 12, and therefore, the phase of the inertia force advances by 90 degrees with respect to the generation of the damping force which is proportional to the sprung or unsprung speed. In the embodiment, a degree of feedback of the torsional torque Td is weakened as the steering angle speed Vθst increases, and therefore, the torque of the motor 56 is kept relatively high and the ground load is increased transiently, and thereby it is possible to make the posture of the wheel difficult to change. Consequently, the phase delay of generation of a lateral force of the wheel is reduced and response to the steering angle θst can be made more quickly, and thereby the steering responsiveness or the stability of the operation can be improved.

In the embodiment, the ECU 34 weakens a degree of feedback of the torsional torque Td as the vehicle speed V increases (FIGS. 3 and 4). In other words, the ECU 34 reduces a degree of canceling the torsional torque Td as the vehicle speed V increases. Consequently, a degree of feedback of the torsional torque Td is weakened (or a degree of cancellation is reduced) as the vehicle speed V increases, and therefore, with the same action as the steering angel speed Vθst, the stability of the vehicle 10 in a high vehicle speed region can be ensured.

In the embodiment, the ECU 34 is provided with the reference control amount calculation section 80, which calculates a target reference force Fref_tar as a reference control amount Uref of the motor 56 (electric motor), the correction control amount calculation section 82, which calculates a target motor current Imot_tar as a correction control amount Ucor by correcting the target reference force Fref_tar, and the motor control section 84 (electric motor control section), which controls the motor 56 on the basis of the target motor current Imot_tar (FIGS. 1 and 3). The correction control amount calculation section 82 reflects a difference ΔT1 between the torsional torque Td and the torque (target reference torque Tref_tar) corresponding to the target reference force Fref_tar in the target reference force Fref_tar to calculate the target motor current Imot_tar (FIGS. 2 and 3). Thereby a disturbance factor included in the torsional torque Td can be accurately excluded.

In the embodiment, a magnetostrictive torque sensor is used as the torque sensor 20 (torque detection unit) (FIG. 1). Thereby the torsional torque Td of the output shaft 60 of the motor 56 (electric motor) can be accurately detected.

B. Variations

The configuration of the electromagnetic damper is not limited to the embodiment, and various configurations may be adopted on the basis of the description in the specification. For example, the following configurations can be adopted.

B1. Application Target

In the embodiment, the example in which the electromagnetic damper 12 is applied to the vehicle 10 (especially the suspension device) is explained. However, the application of the damper 12 is not limited thereto from the viewpoint of, for example, controlling the motor 56 so as to cancel a torsional torque Td. For example, the electromagnetic damper 12 may be applied to another device (for example, a manufacturing device or an elevator) that requires a vibration damping performance.

B2. Electromagnetic Damper 12

B2-1. Damper Body 30

In the embodiment, the damper body 30 having the configuration illustrated in FIG. 1 is used (FIG. 1). However, the damper body 30 is not limited thereto from the viewpoint of, for example, controlling the motor 56 so as to cancel a torsional torque Td. For example, a configuration of electromagnetic hydraulic hybrid type, ball screw type, rack pinion type, direct type (linear motor), or the like may be used as long as the configuration uses an actuator that uses the motor 56.

B2-1-1. First Variation

Figure 6:
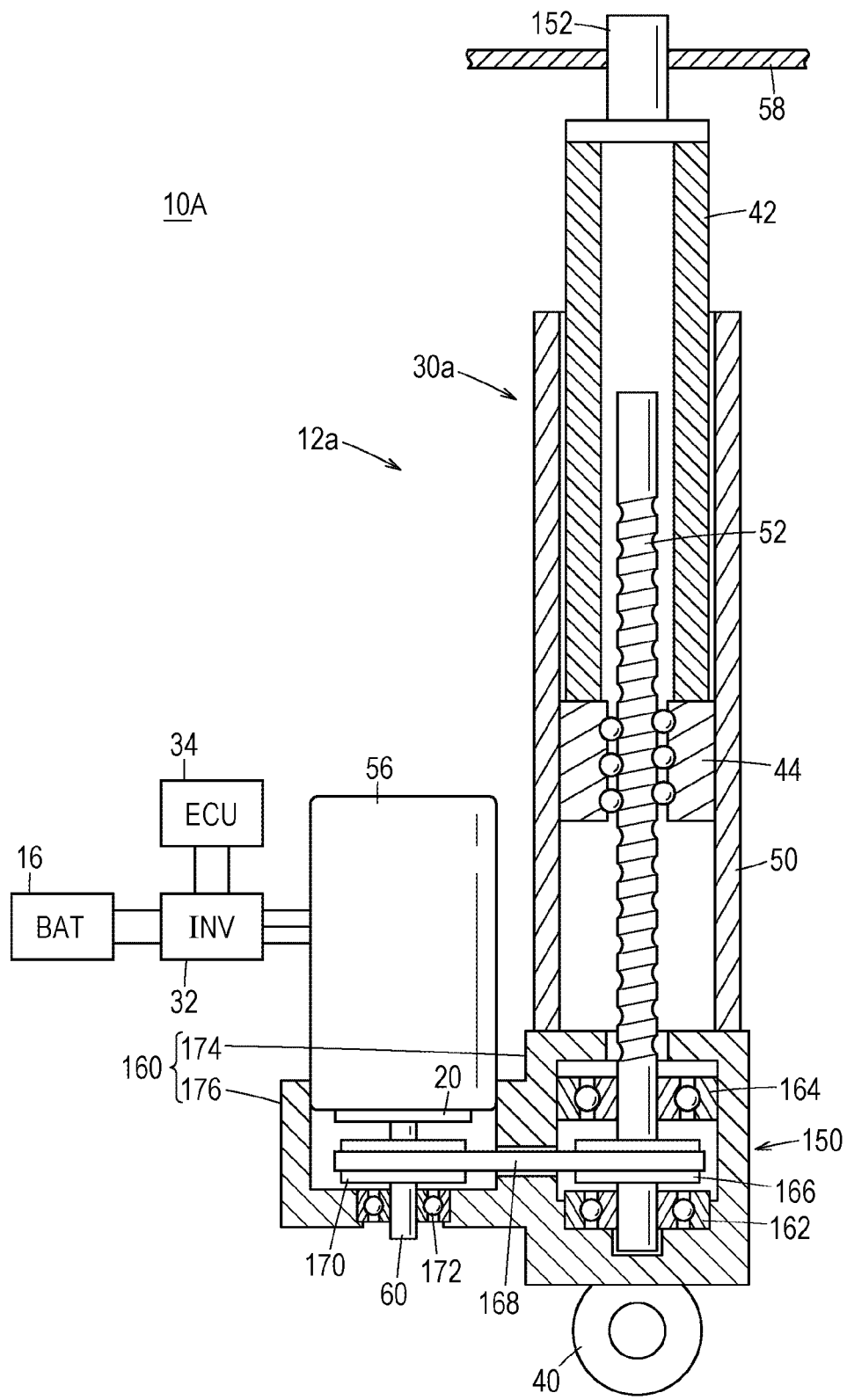
FIG. 6 is a simplified diagram illustrating a part of a vehicle in which an electromagnetic damper according to a first variation is mounted.

FIG. 6 is a simplified diagram illustrating a part of a vehicle 10A in which an electromagnetic damper 12a (hereinafter also referred to as "damper 12a") according to a first variation is mounted. The same components as the embodiment (FIG. 1) are denoted by the same reference signs, and explanations thereof are omitted. In FIG. 6, sensors 14, except for a torque sensor 20, are not shown.

The damper 12a has a damper body 30a, an inverter 32, and an electronic control unit 34 (ECU 34). The damper body 30a is provided with a connection section 40, an outer tube 50, a motor 56, and a connection mechanism 150 as members on the side of a wheel (not shown). Furthermore, the damper body 30a is provided with an inner tube 42, a nut 44, and a connection member 152 as members on the side of a vehicle body 58.

An output shaft 60 of the motor 56 and a threaded shaft 52 are rotatably connected to the connection mechanism 150. The connection mechanism 150 has a housing 160, bearings 162, 164, a threaded-shaft-side pulley 166, an endless belt 168, a motor-side pulley 170, and a bearing 172.

The housing 160 has a threaded-shaft-side holding section 174 and a motor-side holding section 176. The threaded-shaft-side holding section 174 fixes and supports the outer tube 50 and rotatably supports the threaded shaft 52 via the bearings 162, 164. The motor-side holding section 176 rotatably supports the output shaft 60 of the motor 56 via the bearing 172. The motor-side holding section 176 also fixes and supports a side wall of the motor 56.

The threaded-shaft-side pulley 166 is fixed to the threaded shaft 52. The motor-side pulley 170 is fixed to the output shaft 60 of the motor 56.

When an external vibration is input to the connection section 40 from a wheel side and the connection section 40 is applied with, for example, an upward thrust (a so-called damping direction) in FIG. 6, the outer tube 50 moves upward relative to the inner tube 42 and the nut 44, thereby rotating the threaded shaft 52. A rotational force of the threaded shaft 52 is transmitted to the output shaft 60 of the motor 56 via the threaded-shaft-side pulley 166, the endless belt 168, and the motor-side pulley 170. In doing so, vibration of the spring of the suspension device can be damped by generating a reaction force from the motor 56 with respect to the threaded shaft 52.

B2-1-2. Second Variation

Figure 7:
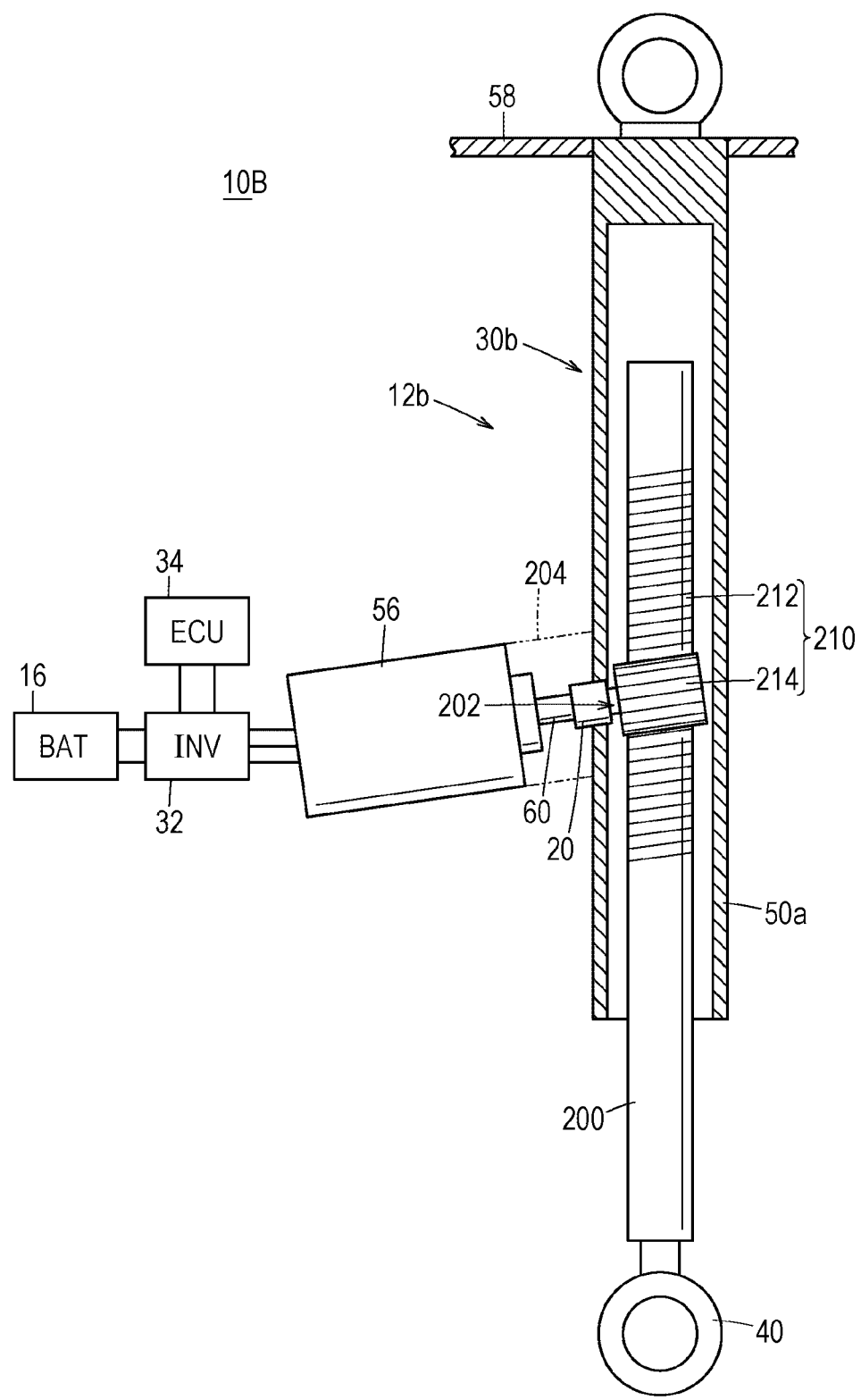
FIG. 7 is a simplified diagram illustrating a part of a vehicle in which an electromagnetic damper according to a second variation is mounted.

FIG. 7 is a simplified diagram illustrating a part of a vehicle 10B in which an electromagnetic damper 12b (hereinafter also referred to as "damper 12b") according to a second variation is mounted. The same components as the embodiment (FIG. 1) are denoted by the same reference signs, and explanations thereof are omitted. In FIG. 7, sensors 14, except for a torque sensor 20, are not shown.

The damper 12b has a damper body 30b, an inverter 32, and an electronic control unit 34 (ECU 34). The damper body 30b is provided with a connection section 40 and an inner rod 200 (rack shaft) as members on the side of a wheel (not shown). Furthermore, the damper body 30b is provided with an outer tube 50a, a pinion shaft 202, and a motor 56 as members on the side of a vehicle body 58. An output shaft 60 of the motor 56 is provided with a torque sensor 20. The motor 56 is fixed to a housing 204. As a relationship between FIG. 1 and FIG. 6, the members on the side of the wheel and the members on the side of the vehicle body 58 may be exchanged.

A rack tooth 212 (rack gear) is formed on the inner rod 200. A pinion 214 (pinion gear) is formed on the pinion shaft 202. The rack tooth 212 and the pinion 214 form a rack and pinion mechanism 210. The pinion shaft 202 is connected to the output shaft 60 of the motor 56.

When an external vibration is input to the connection section 40 from a wheel side and the connection section 40 is applied with, for example, an upward thrust (a so-called damping direction) in FIG. 7, the inner rod 200 is displaced toward the outer tube 50a, thereby rotating the pinion shaft 202. A rotational force of the pinion shaft 202 is transmitted to the output shaft 60 of the motor 56. In doing so, vibration of the spring of the suspension device can be damped by generating a reaction force from the motor 56 with respect to the pinion shaft 202.

As a basic configuration of the damper body 30b, an existing feature (see, for example, Japanese Unexamined Patent Application Publication No. 2009-150465, the entire contents of which are incorporated herein by reference) may be used.

B2-1-3. Third Variation

Figure 8:
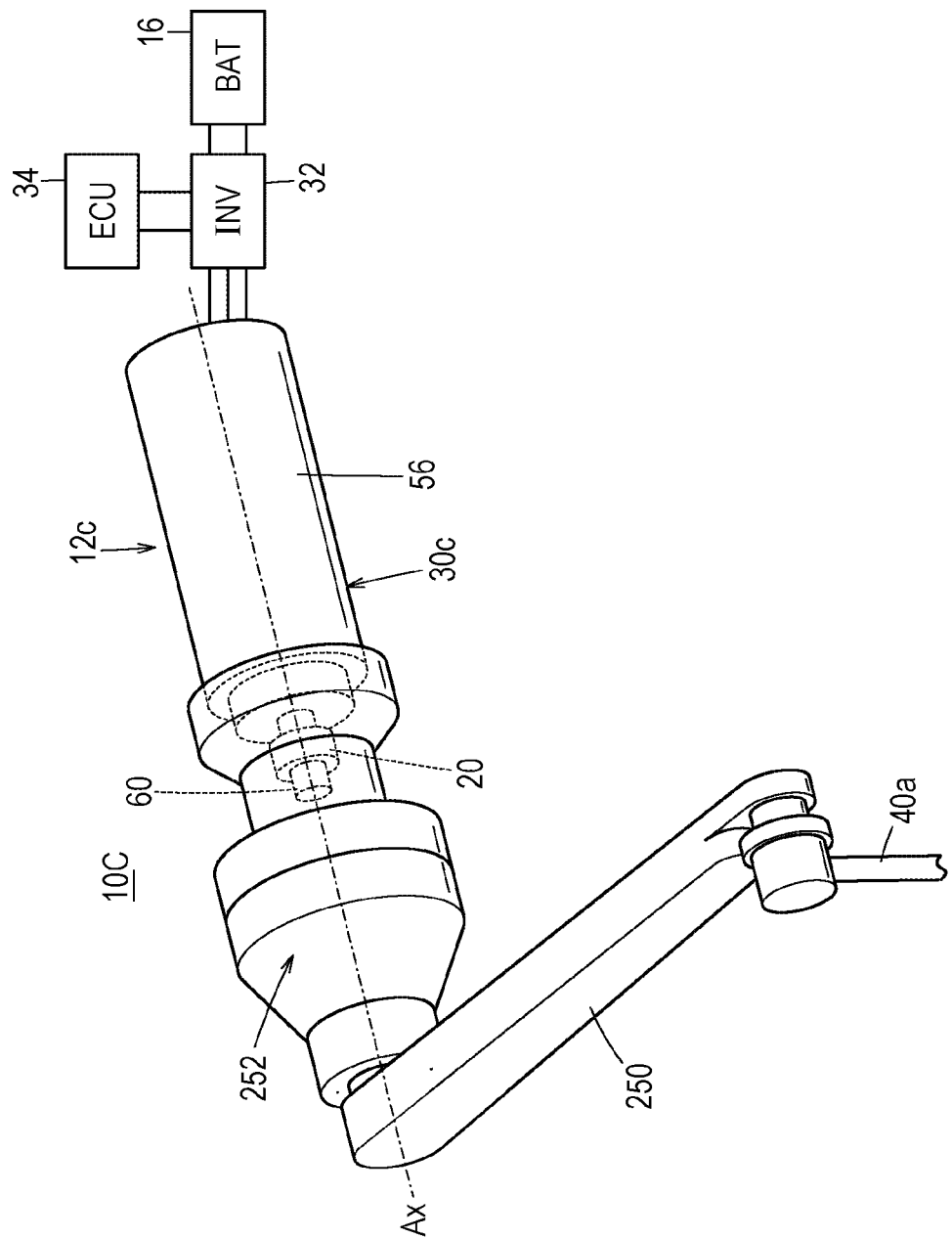
FIG. 8 is a simplified diagram illustrating a part of a vehicle in which an electromagnetic damper according to a third variation is mounted.

FIG. 8 is a simplified diagram illustrating a part of a vehicle 10C in which an electromagnetic damper 12c (hereinafter also referred to as "damper 12c") according to a third variation is mounted. The same components as the embodiment (FIG. 1) are denoted by the same reference signs, and explanations thereof are omitted. In FIG. 8, sensors 14, except for a torque sensor 20, are not shown.

The damper 12c has a damper body 30c, an inverter 32, and an electronic control unit 34 (ECU 34). The damper body 30c is provided with a connection section 40a and a rotary arm 250 (hereinafter also referred to as "arm 250") as members on the side of a wheel (not shown). Furthermore, the damper body 30c is provided with a reduction gear 252 and a motor 56 as members on the side of a vehicle body. An output shaft 60 of the motor 56 is provided with a torque sensor 20. As a relationship between FIG. 1 and FIG. 6, the members on the side of the wheel and the members on the side of the vehicle body 58 may be exchanged.

The connection section 40a (pivotally connected to one (first) end of the arm 250) is fixed to a knuckle (not shown) of a suspension device, thereby being connected to a wheel, while the other (second) end of the arm 250 is fixed to the output shaft of the motor 56 so that the arm 250 swingably moves around the other end to rotate together with the output shaft of the motor 56. When an external vibration is input to the connection section 40a from a wheel side and the connection section 40a is applied with, for example, an upward thrust (a so-called damping direction) in FIG. 8, the rotary arm 250 starts to rotate around a rotation axis Ax. In doing so, vibration of the spring of the suspension device can be damped by generating a reaction force from the motor 56 with respect to the rotary arm 250 via the reduction gear 252.

As a basic configuration of the damper body 30c, an existing feature (see, for example, Japanese Unexamined Patent Application Publication No. 2-227314, the entire contents of which are incorporated herein by reference) may be used.

B2-2. Motor 56

In the embodiment, a three-phase AC brushless motor is used as the motor 56, but is not limited thereto from the viewpoint of, for example, controlling the motor 56 so as to cancel a torsional torque Td. For example, the motor 56 may be a three-phase AC brush motor. In addition, the motor 56 may be a DC motor.

B2-3. Torque Sensor 20

In the embodiment, the torque sensor 20 is arranged outside the motor 56 (FIGS. 1 and 6 to 8). However, the arrangement of the torque sensor 20 is not limited thereto from the viewpoint of, for example, detecting a torsional torque Td of a rotation shaft that transmits power of the motor 56.

Figure 9:
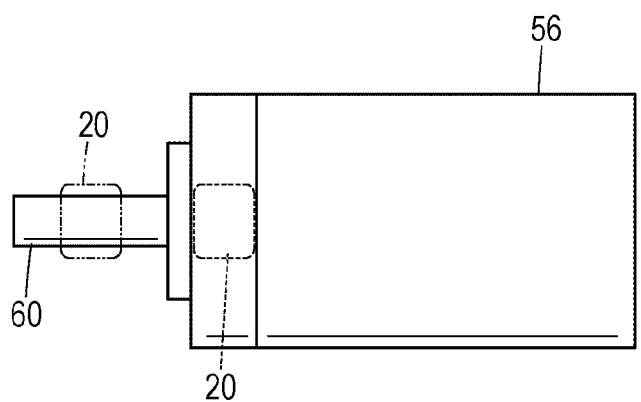
FIG. 9 shows a variation of arrangement of a torque sensor.

FIG. 9 shows a variation of arrangement of the torque sensor 20. As shown by a dashed line in FIG. 9, the torque sensor 20 may be arranged inside the motor 56. Note that a double-dashed line in FIG. 9 indicates the torque sensor 20 arranged outside the motor 56.

In the embodiment, the torque sensor 20 is arranged so as to face the output shaft 60 of the motor 56 and detects a torsional torque Td of the output shaft 60 (the rotation shaft that transmits power of the motor 56) (FIGS. 1 and 6 to 9). However, the detection of the torque sensor 20 is not limited thereto from the viewpoint of, for example, detecting a torsional torque Td of the rotation shaft that transmits power of the motor 56.

For example, the torque sensor 20 may detect a torsional torque Td of the threaded shaft 52 (FIGS. 1 and 6), the pinion shaft 202 (FIG. 7) or the rotary arm 250 (FIG. 8). For example, in FIG. 6, the torque sensor 20 may be arranged on either the outer tube 50 or the threaded-shaft-side holding section 174. If another rotation shaft is interposed between the output shaft 60 of the motor 56 and the threaded shaft 52, a torsional torque Td of the rotation shaft may be used as a torsional torque Td of the output shaft 60 or the threaded shaft 52.

B2-4. ECU 34

B2-4-1. Correction Control Amount Calculation Section 82

In the embodiment, the correction control amount calculation section 82 has both the vehicle speed reflection correction section 102 and the steering angle reflection correction section 104 (FIG. 3). However, the configuration of the correction control amount calculation section 82 is not limited thereto from the viewpoint of, for example, controlling the motor 56 so as to cancel a torsional torque Td. For example, the correction control amount calculation section 82 may have only one of the vehicle speed reflection correction section 102 and the steering angle reflection correction section 104. Alternatively, the correction control amount calculation section 82 may have neither of the vehicle speed reflection correction section 102 and the steering angle reflection correction section 104.

In the embodiment, the steering angle reflection correction section 104 adjusts the second gain G2 on the basis of the steering angle speed Vθst (FIGS. 3 and 5). However, the adjustment of the steering angle reflection correction section 104 is not limited thereto from the viewpoint of, for example, adjusting a torsional torque Td according to the lateral acceleration of the vehicle 10. For example, a steering angle θst itself, as an alternative to the steering angle speed Vθst, may be associated with the second gain G2. That is, as the steering angle θst (absolute value) increases, the second gain G2 may be increased. Alternatively, the steering angle reflection correction section 104 may increase the second gain G2 as a lateral acceleration (absolute value) detected by a lateral acceleration sensor (not shown) increases.

In the embodiment, the second subtracter 118 of the correction control amount calculation section 82 calculates the difference between the target reference current Iref_tar and the F/B current Ifb as the target motor current Imot_tar (FIG. 3). In other words, the correction control amount calculation section 82 reflects the difference ΔT1 between the torque corresponding to the reference control amount Uref and the torsional torque Td in the reference control amount Uref with a unit of the current value [A] of the motor 56. However, the unit is not limited thereto from the viewpoint of, for example, reflecting the difference between the torque corresponding to the reference control amount Uref and the torsional torque Td in the reference control amount Uref, and the calculation may be performed by using a different unit (such as torque [Nm] or force [N]).

B2-4-2. Others

In the embodiment, it is assumed that the ECU 34 is formed of a digital circuit (FIG. 1), but a part or the whole of the ECU 34 may be formed of an analog circuit.

What is claimed is:

1. An electromagnetic damper comprising:
an electric motor having an output shaft to generate an damping force;
a transmission member provided with the electromagnetic damper and configured to receive an external vibration force, the transmission member being connected to the output shaft and configured to transmit the external vibration force to the output shaft of the electric motor so as to damp the external vibration force by the damping force;
a torque detector configured to detect a torsional torque of at least one of the output shaft of the electric motor and the transmission member; and
a control device that controls the electric motor in a manner that cancels the torsional torque detected by the torque detector, in accordance with the detected torsional torque.

2. The electromagnetic damper according to claim 1, wherein the transmission member is a threaded shaft provided with a nut screwed onto the threaded shaft, the nut receiving the external vibration force, thereby moving with respect to the threaded shaft in an axial direction thereof in a manner that converts the linear motion of the nut into rotation of the threaded shaft which rotates the output shaft of the electric motor.

3. The electromagnetic damper according to claim 1, wherein the transmission member receives the external vibration force, thereby moving in its axial direction, and
wherein the transmission member has a rack gear formed thereon along the axial direction, and the output shaft of the electric motor has a pinion gear, the rack gear and the pinion gear engaging each other in a manner that converts the linear motion of the transmission member into rotation of the pinion gear and the output shaft of the electric motor.

4. The electromagnetic damper according to claim 1, wherein the transmission member is a rotary arm which has a first end and second end, the first end receiving the external vibration force, the second end being connected to the output shaft of the electric motor in such a manner that the rotary arm rotates with the output shaft at the second end in response to the external vibration force input to the first end, thereby rotating the output shaft.

5. The electromagnetic damper according to claim 1, wherein the electromagnetic damper is installed in a suspension device of a vehicle.

6. The electromagnetic damper according to claim 5, wherein the control device receives a signal of a steering angle or a steering angle speed of a steering of the vehicle and controls the electric motor in a manner that reduces a degree of canceling the torsional torque as the steering angle or the steering angle speed of the steering increases.

7. The electromagnetic damper according to claim 5, wherein the control device receives a signal of a vehicle speed of the vehicle and controls the electric motor in a manner that reduces a degree of canceling the torsional torque as the vehicle speed of the vehicle increases.

8. The electromagnetic damper according to claim 1, wherein the control device comprises,
a reference control amount calculator that calculates a reference control amount for controlling the electric motor,
a correction control amount calculator that receives and corrects the reference control amount by reflecting a difference between the detected torsional torque and a reference torque corresponding to the reference control amount in the reference control amount, thereby obtaining a correction control amount, and an electric motor controller that receives the correction control amount and controls the electric motor on the basis of the correction control amount.

9. The electromagnetic damper according to claim 1, wherein the torque detector is a magnetostrictive torque sensor attached to said at least one of the output shaft of the electric motor and the transmission member.

* * * * *